United States Patent [19]

Harding et al.

[11] Patent Number: 4,739,796

[45] Date of Patent: Apr. 26, 1988

[54] FLUID FLOW DIVERTER

[75] Inventors: Paul J. Harding, Buchanan; K. Peter Koch, Locust Valley, both of N.Y.

[73] Assignee: Water Services of America, Inc., Milwaukee, Wis.

[21] Appl. No.: 33,361

[22] Filed: Apr. 2, 1987

Related U.S. Application Data

[63] Continuation-in-part of Ser. No. 829,297, Feb. 13, 1986, abandoned.

[51] Int. Cl.⁴ .............................................. F16K 11/072
[52] U.S. Cl. ................................ 137/625.43; 137/584; 251/307
[58] Field of Search ..................... 137/625.43; 251/307

[56] References Cited

U.S. PATENT DOCUMENTS

| 544,799 | 8/1895 | Swindell | 137/625.43 X |
| 3,269,414 | 8/1966 | Mayo | 137/625.43 X |
| 3,307,583 | 3/1967 | Harter | 137/625.43 |
| 3,412,975 | 11/1968 | Kurkjian | 251/307 X |

*Primary Examiner*—Robert G. Nilson
*Attorney, Agent, or Firm*—Burton E. Levin

[57] ABSTRACT

Fluid flow diverter apparatus is described for reversing the direction of fluid flow through a process loop, such as a bundle of heat exchange tubes in an air conditioning system. The apparatus utilizes a housing enclosing a rotary valve in which the diverter disk seats in two positions against generally U-shape seating frames that can be repositioned to compensate for erosion or other distortion of the seating surfaces on the frames and disk. The seating frames comprise a plurality of seating bars, each of which is adjustably fastened to the interior of the valve casing by at least one threaded fastener that extends through a transverse slot in the bar and engages the casing. All seating surfaces preferably are coated with a resilient material, such as rubber. Three of the four ports of the valve casing are connected to pipes that extend through the wall of the housing and one of the ports opens into the interior of the housing and is in fluid communication through that interior space with another pipe extending out of the housing. This permits the use of straight and parallel inlet and outlet lines entering one side of the housing and straight and parallel reversible flow lines entering the opposite side of the housing. A hatch in the housing provides access to the seating frames and disk through the open valve port, thereby facilitating their adjustment or replacement.

16 Claims, 3 Drawing Sheets

FLUID FLOW DIVERTER

This is a continuation in part of copending application Ser. No. 829,297, which was filed Feb. 13, 1986 now abandoned.

BACKGROUND OF THE INVENTION

1. Field of the Invention

This invention relates generally to an improved rotary valve in which a diverter disk seats against a generally U-shape seating frame. More specifically, it relates to the use of such improved valve in a heavy duty fluid flow diverter apparatus for reversing fluid flow through a process loop. Such apparatus is particularly well adapted for alternating the direction of flow of the cooling water in heat exchange systems that utilize the pressure of the cooling water to propel brushes or other cleaning elements back and forth through heat exchange tubes to remove scale.

2. Description of the Prior Art

Air conditioning or refrigerating systems that utilize alternate compression and expansion of a refrigerant gas require means to remove heat from the refrigerant following the compression cycle. Commercial systems commonly employ tubular heat exchangers for this purpose.

A typical tubular heat exchanger for a commercial air conditioning system is an elongated vessel having bundles of heat exchange tubes supported at their ends by tube sheets that separate the exterior surfaces of the tubes from the water boxes at the ends of the vessel. The interiors of all of the tubes are open to an individed water box at one end of the vessel and half of these tubes are open to each chamber of the divided water box at the other end of the vessel. The compressed refrigerant which is to be cooled or condensed flows over the exterior surface of the tubes in the space between the tube sheets. Cooling water enters one chamber of the divided water box, passes through the tubes that are open to that chamber into the undivided water box and then through the remaining tubes into the second chamber of the divided water box. Cooling water thus enters and leaves the heat exchanger vessel at the same end.

Since raw water or inadequately demineralized water usually is used, it is necessary to frequently remove precipitated minerals or scale from the inside of the heat exchange tubes in order to prevent corrosion and heat transfer inhibition. A common method of doing so is to utilize the cooling water pressure to drive a brush or other cleaning element through each tube in the bundle. As described in U.S. Pat. No. 3,319,710, each tube in the bundle terminates at each end in a cage, one of which contains the tube brush. When it is desire to clean the tubes, the direction of flow of the cooling water is reversed, driving the brushes through the tubes and into the cages at the opposite ends of the tubes.

Reversing the direction of flow of the cooling water can be accomplished by a wide variety of 4-way valves, illustrative of which is the valve shown in U.S. Pat. No. 3,307,583, which varies the direction of flow by rotation of a diverter disk between seated positions abutting generally U-shape resilient sealing strips that are fixedly attached to the inside of the valve casing. A major disadvantage of such prior art 4-way valve is the fact that, under heavy duty usage, erosion or distortion of the seating surfaces on the resilient sealing strips, as well as on the disk, causes excessive leakage and the valve frequently must be taken off line for tedious repairs or replacement. Another disadvantage of such valve is the fact that the supply and return ports are on opposite sides of the casing and are separated by the reversible flow ports. This requires that the valve be surrounded by a maze of pipes and elbows in order to connect to the generally parallel and closely spaced reversible flow lines emerging from the heat exchanger, as well as the water supply and return lines, which also usually are parallel and closely spaced. When the available space in the vicinity of the valve is limited, as it commonly is, such tangle of external piping can obstruct access to the valve and may be a physical hazard to workers in an extremely cramped working area.

One means of solving this problem is set forth in U.S. Pat. No. 3,973,592. This patent describes a 4-way valve in which a plug type diverter is rotatable within four circumferentially spaced cage bars that form pairs of opposed seats for sealing engagement with the two edges of the valve plug to connect various chambers within the valve housing with upstream and downstream fluid flow lines, depending on the rotary position of the valve plug.

While this valve effectively eliminates the need for an external maze of pipes and elbows, it has a number of serious disadvantages. The use of cage bars for plug sealing requires extremely close tolerances to prevent excessive leakage and the tortuous flow paths around the various walls and partitions within the valve housing results in a significant fluid pressure drop. The utilizationi of numerous walls and partitions within the valve housing also creates a complex structure that is difficult and expensive to manufacture and that often necessitates removal of the diverter from the line for extensive periods for repair or other service. This service difficulty can be particularly troublesome when abrasive solids occasionally become suspended in the fluid or when the diverter is used in seasonal applications, such as in an air conditioning system, where the plug valve often is found to be jammed after a period of disuse.

The need for an external maze of pipes and elbows to connect the diverter to the generally parallel incoming and outgoing fluid lines also can be avoided by the compact and jam resistant diverter described in copending application Ser. No. 829,297. This diverter utilizes a 4-way valve comprising a pipe casing containing an oval rubber edged butterfly disk having its short axis diametrally positioned within the pipe casing so that the edge of the disk is seatable in two positions against the inner wall of the casing when the disk is rotated about its short axis. Two ports are located at opposite ends of the pipe casing and two additional ports are concentrically positioned in the wall on opposite sides of the disk, so that the end ports alternately can be placed in fluid communication with either of the side ports by turning the disk from one seated position to the other. A housing which encloses the 4-way valve has pairs of closely spaced orifices distally positioned in its wall for connection with parallel external fluid lines. Separate fluid conduits connect these orifices to the valve ports with one or two of these conduits being free space in the interior of the housing.

Because of the rubber to metal seal created by the rubber periphery of this oval disk seating against the pipe casing, the leakage rate is far less than the metal to metal seals of earlier diverters. However, erosion of the rubber or distortion of the disk sometimes occurs in heavy duty applications due to high fluid pressures or the introduction of extraneous solids, and the resulting increased leakage necessitates removal of the disk for repair or replacement.

SUMMARY OF THE INVENTION

It is an object of this invention to provide a durable and easily serviced or repaired valve of the type in which a diverter disk is rotated to abut its periphery against a seating member attached to the valve casing in order to obturate a valve port or vary the direction of flow through the valve. It is another object of this invention to utilize a 4-way valve of this improved type in a fluid flow diverter apparatus which requires no external pipe elbows to align the upstream feed and return lines and the downstream reversible flow lines. It is a further object to provide such means for reversing fluid flow through a process loop that is compact, durable and both easily fabricated and serviced and that is resistant to jamming after periods of disuse. A specific object is to provide such fluid flow diverter apparatus that exhibits minimal leakage under high fluid pressures and is, therefore, particularly well adapted for reversing the direction of flow of cooling water through a tubular heat exchanger that is equipped with a mobile brush cleaning system. These objects and other advantages, which will be apparent from this specification, are achieved by the invention described below.

Broadly, one aspect of this invention is an improved rotary valve having a valve casing enclosing a diverter disk which is rotatable on a shaft to seat against a generally U-shape seating frame attached to the inside of the casing, the improvement comprising means for adjustably positioning that frame to minimize the separation between the seating surfaces on the frame and the disk.

Illustrative of such improvement is a 4-way valve comprising (a) a drum valve casing having a cylindrical wall closed at each end by a circular flat end cover and first, second, third and fourth ports in said cylindrical wall, (b) a rectangular diverter disk enclosed within said casing and having a pair of opposed edges parallel to the axis of said casing, said disk being mounted on a shaft that is axially positioned within said casing and is journaled for rotation in the center of both said end covers, (c) a generally U-shape frame demountably fastened to the interior of said casing between each adjacent pair of said ports, each said frame providing a seating surface for said disk so that said disk is seatable in two positions, said first position placing said first port in fluid communication with said third port and said second port in fluid communication with said fourth port and said second seated position placing said first port in fluid communication with said fourth port and said second port in fluid communication with said third port and (d) means for adjustably positioning each said frame generally normal to its said seating surface.

Because of the fact that the seating surfaces of the frames and disk rarely match perfectly, it usually is desirable that one or both of these surfaces be a resilient material such as rubber. It also has been found that more serious imperfections in these surfaces resulting from uneven wear or minor damage from extraneous solids can be compensated for by using a seating frame made of multiple seating bar which are separately adjustable. A simple and effective means of accomplishing this is by adjustably fastening each seating bar to the interior of the valve casing by at least one threaded fastener that extends through a transverse slot in the bar and engages the housing. This permits entire segments of the seating frame or either end of each segment to be separately moved toward or away from the disk.

Another aspect of this invention is a fluid flow diverter apparatus comprising (a) the 4-way valve described above, (b) a housing enclosing said valve and (c) a separate fluid conduit extending from each of said first, second, third and fourth ports to a separate first, second, third and fourth orifice, respectively, in the outer wall of said housing, three of said separate fluid conduits being pipes and one said separate conduit being the interior of said housing.

DESCRIPTION OF THE PREFERRED EMBODIMENT

Figure 1:
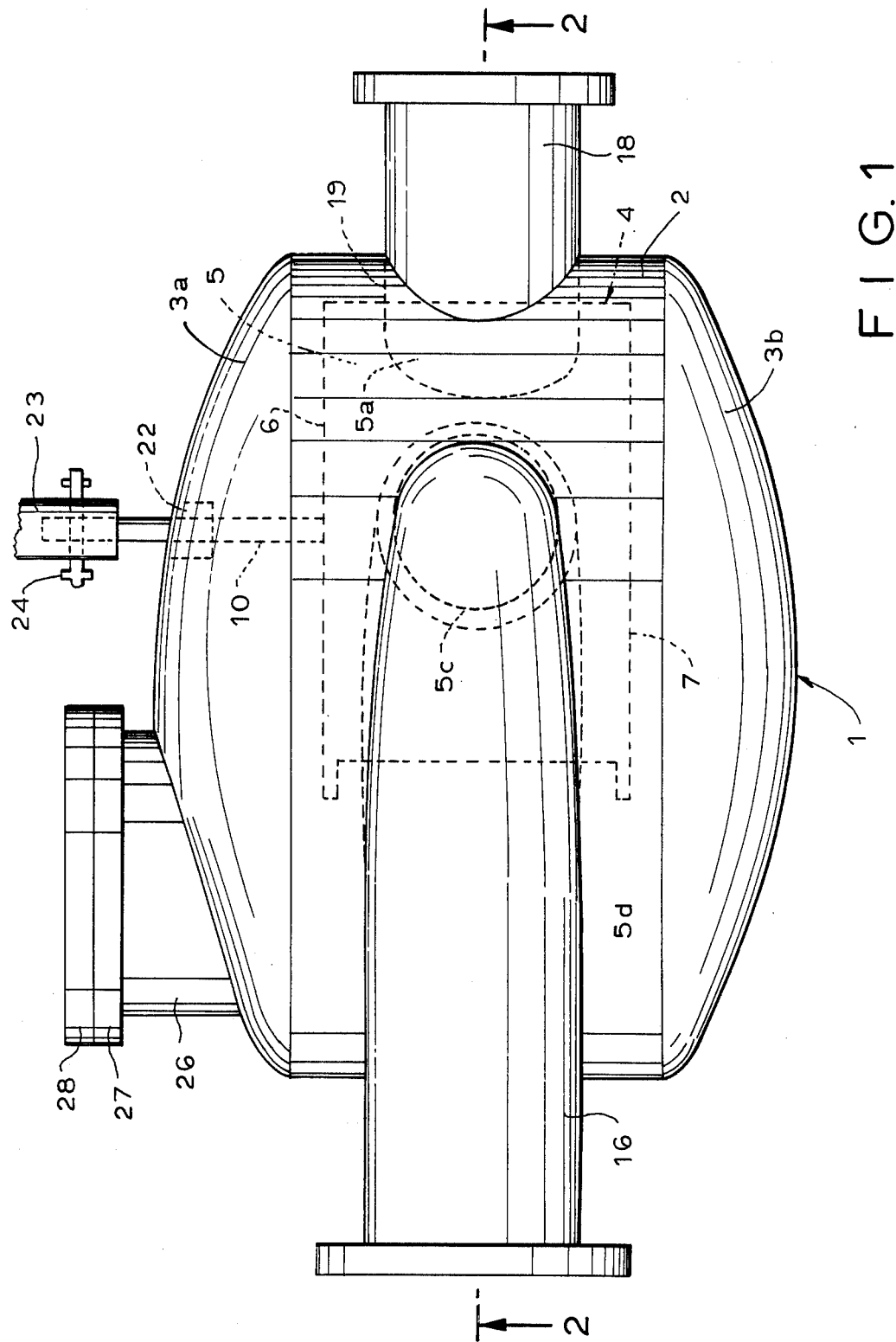
FIG. 1 is a schematic side elevation of a fluid flow diverter of this invention in which a 4-way valve is enclosed within a cylindrical housing having domed end covers, an access hatch and parallel external piping.
Figure 2:
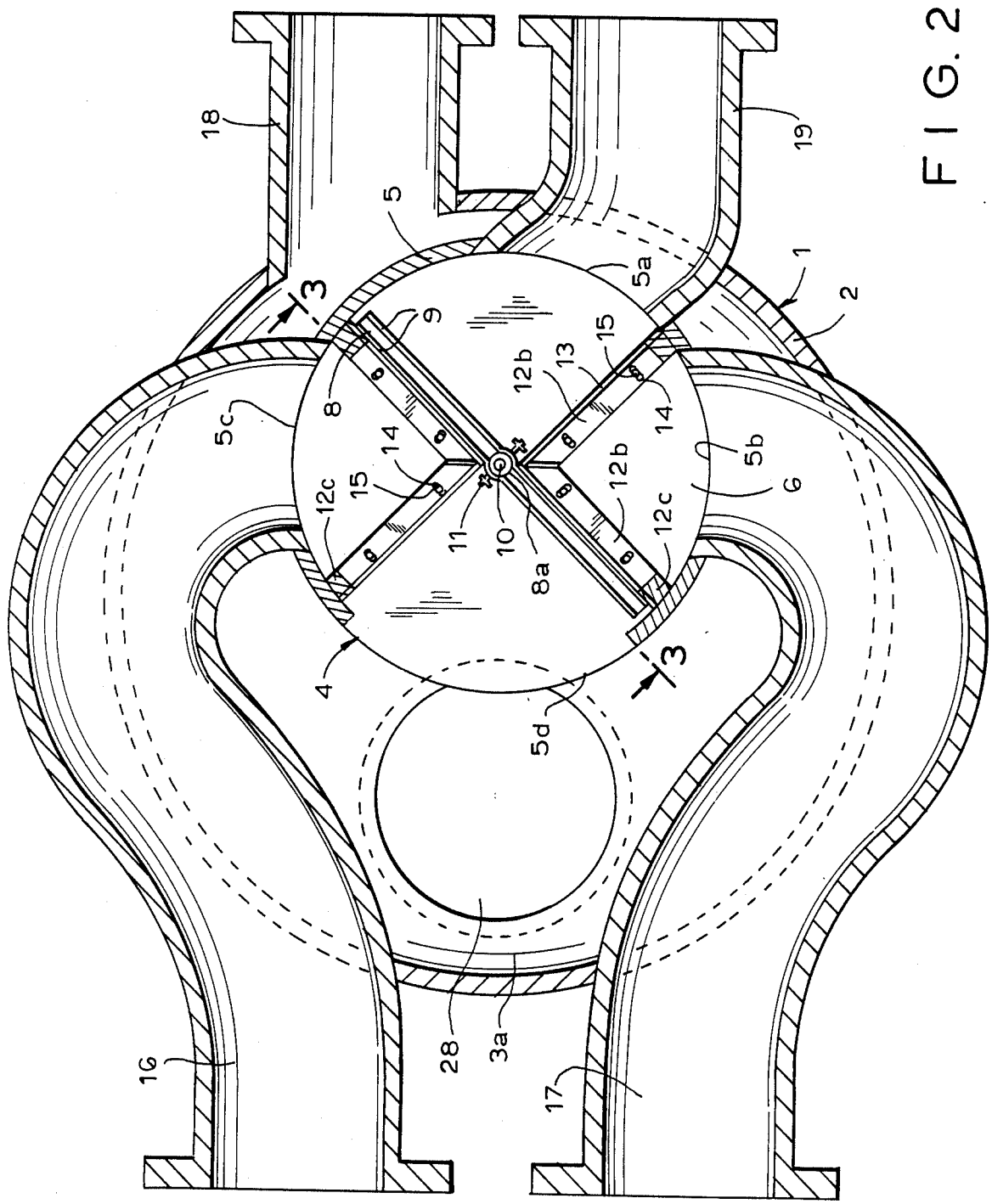
FIG. 2 is a cross sectional view along line 2—2 of FIG. 1 showing a rectangular diverter disk seated in one of the two possible positions against adjustably positionable seating bars on the interior of a drum casing which has three ports that are connected to pipes that extend outside of the enclosing housing and a fourth port that opens to the interior of the housing and is in fluid communication through that interior with another pipe extending out of the housing.

FIGS. 1 through 4 show an especially preferred fluid diverter apparatus in which a sturdy and readily accessible 4-way valve having adjustable seats is enclosed within a housing which has free space that provides an unpiped fluid connection between one of the valve ports and an external line. The closely spaced and parallel external lines, coupled with the durable and easily serviced valve, makes the apparatus uniquely adapted for use in conjunction with an air conditioning system heat exchanger that utilizes a reversible flow of cooling water through a bundle of heat exchange tubes to propel tube cleaning brushes back and forth through the tubes. Although the following description of its mode of operation will specifically refer to such air conditioning system, it will be obvious that the 4-way valve and fluid flow diverter apparatus of this invention also can be used in other applications that require a reversible flow of fluid through a process loop.

The 4-way valve 4 has a cylindrical wall 5, a flat round top cover 6 and a flat round bottom cover 7 which define a drum casing for rectangular diverter disk 8. Disk shaft 10, which is journaled for rotation in fluid tight bushing 20 and thrust bearing 21 in the center of covers 6 and 7, respectively, extends through centrally positioned bore 8a in disk 8 and is rotationally locked to disk 8 by quick release shear pins 11. Shaft 10 extends through fluid tight bushing 22 in top domed cover 3a of housing 1 and is rotationally locked in chuck 23 by quick release shear pin 24. Chuck 23 is coupled to any suitable rotating means (not shown) such as a manual turning wheel or a step motor.

Valve ports 5a, 5b, 5c and 5d are positioned about 45° apart in cylindrical wall 5. Fluid flow control through these ports is accomplished through cooperation between disk 8 and a plurality of adjustably positionable metal seating bars which form seating frames between adjacent ports. Each such frame has a vertical seating bar 12c that is adjustably fastened to the inside of the cylindrical wall 5 of the drum casing and extends from flat top cover 6 to flat bottom cover 7, a top seating bar 12b that is adjustably fastened to the inside of flat top cover 6 and extends transversely from bar 12c toward shaft 10 and a bottom seating bar 12a that is adjustably fastened to the inside of flat bottom cover 7 and that also extends transversely from bar 12c toward shaft 10. Disk 8 can thereby be seated in two positions, the first seated position placing ports 5b and 5c in fluid communication with ports 5a and 5d, respectively, and the second seated position placing ports 5b and 5c in fluid communication with ports 5d and 5a, respectively.

In order to minimize leakage, at least the surfaces of the seating bars which contact other seating bars, disk 8 and the inner surface of drum casing 4 are made of a resilient material 13, such as rubber which has been vulcanized while in undisturbed contact with the metal of the bars. A similar resilient coating 9 advantageously covers at least the periphery of disk 8 which contacts the seating bars. For simplicity of fabrication, it usually is desirable to rubber coat the entire surface of both the disk and the bars.

Figure 4:
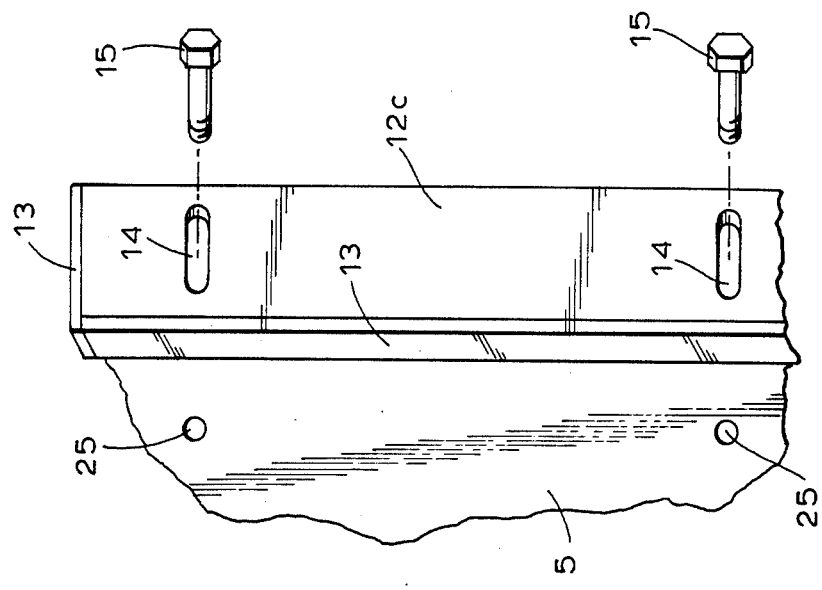
FIG. 4 is an exploded view showing the attachment of an adjustably positionable seating bar to the interior of a drum casing by means of a threaded fastener.
Figure 3:
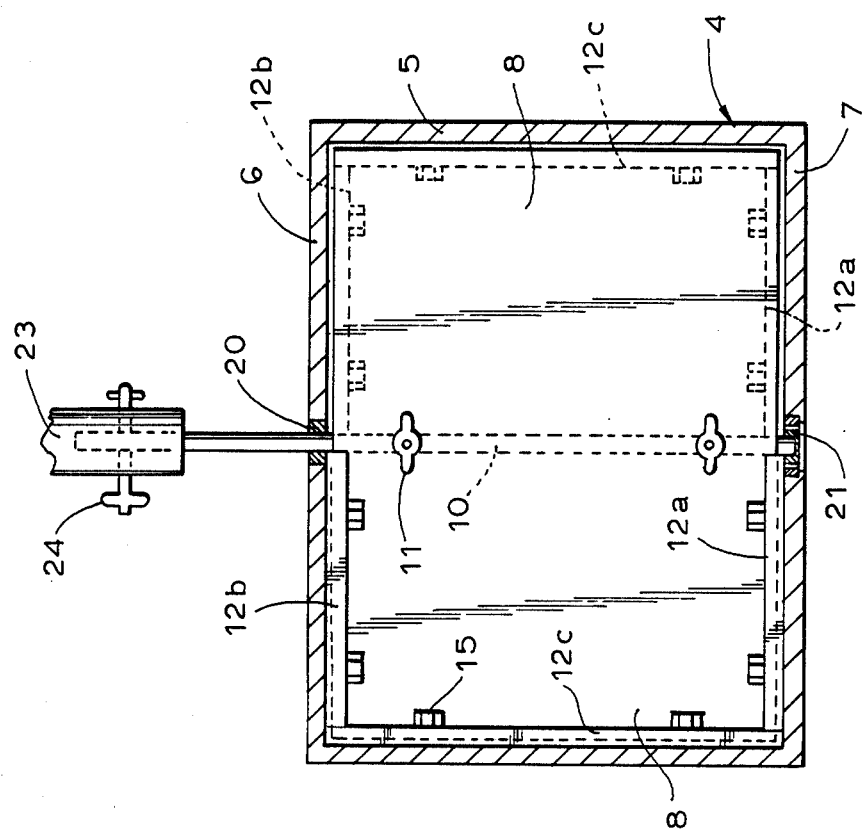
FIG. 3 is a partial vertical sectional view along line 3—3 of FIG. 2 and rotated 90° showing the rectangular diverter disk seated against the seating bars in the drum casing.

The adjustably positionable attachment of the seating bars is illustrated most clearly by FIG. 4, which shows the attachment of a vertical bar 12c to the inside of cylindrical wall 5 by threaded fasteners 15 which extend through transverse slots 14 and engage threaded holes 25 on the inside of cylindrical wall 5. The individual seating bars thus can be moved laterally to insure close contact along their entire length with disk 8.

Housing 1, which enclosed drum casing 4, has a cylindrical wall 2 that is parallel to wall 5 of the eccentrically positioned drum casing, a domed bottom cover 3b and a domed top cover 3a with an interior access hatch 26 that is closed by removable hatch cover 28. Domed top cover 3a also has a fluid tight bushing 22 thru which disk shaft 10 extends. To permit fast access to the interior of housing 1, hatch cover 28 advantageously is locked to flange 27 on hatch 26 by a quick release coupling (not shown), such as a ring clamp. Ports 5b and 5c in drum casing 4 are connected to pipes 17 and 16, respectively, which curve as they penetrate cylindrical wall 2 and are parallel and closely spaced externally on one side of housing 1. Port 5a opens into pipe 19 which also curves as it penetrates cylindrical wall 2 on the other side of housing 1. Port 5d opens into the interior of housing 1 and utilizes the free space therein as a fluid conduit communicating with pipe 18, which extends externally from cylindrical wall 2. Pipe 18 is parallel to and closely spaced from the external portion of pipe 19 and both are in tandem with the external portions of pipes 16 and 17.

In order to minimize pressure drop, the elements described above advantageously are sized so that the minimum cross-sectional area of each of the flow paths through the valve and the fluid conduits within the housing is greater than the minimum cross-sectional area of any of the external pipes.

In normal operation in a water cooled air conditioning system, pipe 17 is the inlet line from a cooling tower and pipe 16 is the return line. When disk 8 is seated in the position shown in FIG. 2, water entering inlet pipe 17 is directed into variable flow pipe 19 which leads to the bundle of heat exchanger tubes. Warm water returns from the tubes through variable flow pipe 18 into the open interior of housing 1, from which it enters open or unpiped port 5d and is directed by disk 8 into return pipe 16 which conveys it back to the cooling tower. To reverse the direction of flow through the heat exchanger tubes, chuck 23 is rotated approximately 90° until disk 8 has come to rest in its other seated position. Cooled water entering inlet pipe 17 now is directed through open port 5d into the interior of housing 1, from which it enters variable flow pipe 18 and is forced through the process loop in the opposite direction. Warm water returns from the heat exchanger through variable flow pipe 19 and is directed by disk 8 thru return pipe 16 to the cooling tower.

While the use of resilient sealing material at the seating surfaces in the 4-way valve of this invention essentially eliminates leakage around the disk, even the sturdiest of such materials is subject to erosion under heavy duty usage, which may eventually lead to imperfectly sealed seating of the disk. In contrast to prior art equipment, the instant fluid flow diverter apparatus can quickly and easily be adjusted to compensate for the eroded seating surfaces. This can be accomplished through hatch 26, which is eccentrically positioned in domed top cover 3a so as to provide relatively unobstructed access to open port 5d in the cylindrical wall of valve 4. By reaching into open port 5d and loosening the threaded fasteners 15 which pass through the lateral slots 14 on each of the seating bars, one can move each bar laterally to press it tightly against disk 8. Tightening of the fastener with the bar in that position effectively reduces any excess clearance. To the extent that a resilient seal on a seating bar becomes excessively eroded or the bar is otherwise damaged, the entire bar can be withdrawn for replacement after removal of its threaded fasteners.

Disk 8, which also is readily accessable through hatch 26, can be removed for repair or replacement by withdrawing quick release shear pins 11, which decouples shaft 10 and permits it to be withdrawn from tubular housing 8a.

It will, of course, be understood that various modifications and additions made be made in the preferred embodiments of the invention described above without departing from the spirit and scope of the invention as defined in the claims below. For example, it will be apparent that adjustable generally U-shape seating frames can be used advantageously in two and three port valves, as well as in the valve of the above embodiment. Similarly, it will be apparent that the precise shape of such frames must conform to the contour of the seating surface of the disk, whether that disk be rectangular, oval or round.

We claim:

1. Four way valve comprising
   (a) a drum valve casing having a cylindrical wall closed at each end by a circular flat and cover and first, second, third and fourth ports in said cylindrical wall,
   (b) a rectangular diverter disk enclosed within said casing and being mounted on a shaft that is axially positioned within said casing and is journaled for rotation in the center of both said end covers, said disk having a pair of opposed edges parallel to said shaft, (c) a generally U-shape frame demountably fastened to the interior of said casing between each adjacent pair of said ports, each said frame providing a seating surface for said disk so that said disk is seatable in two positions, said first position placing said first port in fluid communication with said third port and said second port in fluid communication with said fourth port and said second seated position placing said first port in fluid communication with said fourth port and said second port in fluid communication with said third port and (d) means for adjustably positioning each said frame generally normal to its said seating surface.

2. Valve of claim 1 wherein each of said frames comprises a first elongated seating bar longitudinally positioned on said cylindrical wall of said casing parallel to said shaft, a second elongated seating bar radially positioned on one said cover and extending from said shaft to said first seating bar and a third elongated seating bar radially positioned on the other said cover and extending from said shaft to said first seating bar.

3. Valve of claim 2 wherein each said seating bar is adjustably fastened to the interior of said casing by at least one threaded fastener that extends through a transverse slot in said bar and engages said casing.

4. Valve of claim 3 wherein at least the seating surfaces of said seating bars and said disk are a resilient material.

5. Valve of claim 2 wherein said seating bars are rubber coated metal.

6. Valve of claim 1 wherein said disk is rotationally locked to said shaft by at least one shear pin.

7. Fluid flow diverter apparatus comprising
(a) a 4-way comprising
  (i) a drum valve casing having a cylindrical wall closed at each end by a circular flat end cover and first, second, third and fourth ports in said cylindrical wall,
  (ii) a rectangular diverter disk enclosed within said casing and being mounted on a shaft that is axially positioned within said casing and is journaled for rotation in the center of both said end covers, said disk having a pair of opposed edges parallel to said shaft,
  (iii) a generally U-shape frame demountably fastened to the interior of said casing between each adjacent pair of said ports, each said frame providing a seating surface for said disk so that said disk is seatable in two positions, said first position placing said first port in fluid communication with said third port and said second port in fluid communication with said fourth port and said second seated position placing said first port in fluid communication with said fourth port and said second port in fluid communication with said third port and
  (iv) means for adjustably positioning each said frame generally normal to its said seating surface,
(b) a housing enclosing said valve and
(c) a separate fluid conduit extending from each of said first, second, third and fourth ports to a separate first, second, third and fourth orifice, respectively, in the outer wall of said housing, three of said separate fluid conduits being pipes and one said separate conduit being free space in the interior of said housing.

8. Fluid flow diverter apparatus of claim 7 wherein each of said frames comprises a first elongated metal seating bar longitudinally positioned on said cylindrical wall of said casing parallel to said shaft, a second elongated metal seating bar radially positioned on one said cover and extending from said shaft to said first seating bar and a third elongated metal seating bar radially positioned on the other said cover and extending from said shaft to said first seating bar, each said seating bar having a resilient seating surface and being adjustably fastened to the interior of said casing by at least one threaded fastener that extends through a transverse slot in said bar and engages said casing.

9. Fluid flow diverter of claim 8 wherein said disk and said seating bars are rubber coated.

10. Fluid flow diverter apparatus of claim 8 wherein said shaft extends through one of said valve casing end covers and said housing.

11. Fluid flow diverter apparatus of claim 10 wherein said extending end of said shaft is coupled through a shear pin to disk turning means.

12. Fluid flow diverter apparatus of claim 8 wherein said disk is rotationally locked to said shaft by at least one shear pin.

13. Fluid flow diverter apparatus of claim 12 wherein said housing has a removably covered opening positioned so as to provide access to said seating bars and said disk through said open port of said 4-way valve.

14. Fluid flow diverter apparatus of claim 8 wherein said first and second orifices are positioned adjacent on one side of said housing, said third and fourth orifices are positioned adjacent on the opposite side of said housing and a separate external pipe extends from each said orifice.

15. Fluid flow diverter apparatus of claim 14 wherein the pair of said external pipes extending from said first and second orifices are parallel, the pair of said external pipes extending from said third and fourth orifices are parallel and said pairs of external pipes are tandemly positioned.

16. Fluid flow diverter apparatus of claim 14 wherein the minimum cross-sectional area of each of the flow paths through said 4-way valve and said separate fluid conduits is greater than the minimum cross-sectional area of any of said external pipes.

* * * * *